April 8, 1924.

C. CONRAD 1,489,521

FRICTION WHEEL CHANGE SPEED GEAR

Filed March 21, 1923

INVENTOR

Carl Conrad.

William C. Linton

Patented Apr. 8, 1924.

1,489,521

UNITED STATES PATENT OFFICE.

CARL CONRAD, OF COIRE, SWITZERLAND.

FRICTION-WHEEL CHANGE-SPEED GEAR.

Application filed March 21, 1923. Serial No. 626,670.

*To all whom it may concern:*

Be it known that I, CARL CONRAD, a citizen of Germany, residing at Coire, in the Canton of Grisons, Republic of Switzerland, have invented new and useful Improvements in Friction-Wheel Change-Speed Gears, of which the following is a specification.

Friction-wheel change speed gears have already been suggested, in which the transmission of movement and the change of speed was effected by means of rollers so arranged as to slide between two coaxial cone shells placed in one another. However, in this type of gear sliding friction cannot be avoided during transmission and the ratio of transmission is uncertain in every position of the roller owing to the fact that the latter has a certain lateral extension and consequently the contact takes place on a line. Besides this, the manner of supporting these rollers and the fact that they shift on long shafts are rather complicated factors which compromise stability.

This invention has for its object a friction-wheel change speed gear with cone shells arranged in one another, in which the above mentioned disadvantages are removed. In this gear the transmission of movement is effected by means of balls supported in a fixed intermediate cone placed between the two cone shells. Thereby sliding friction during transmission is avoided, resistance to shifting is diminished and the manner of supporting the transmission balls is very stable and simple. Of course, friction-wheel change speed gears with transmission by balls are known in themselves, but they are right angle friction gears, the manner of supporting and shifting the balls thereof not being adapted for use with conical friction wheels placed in one another and the driving and driven organs are not adapted to be arranged coaxially.

An embodiment of the invention is illustrated by way of example in the accompanying drawing, in which like numbers of reference represent like parts in all the figures. In this drawing—

Figure 1:
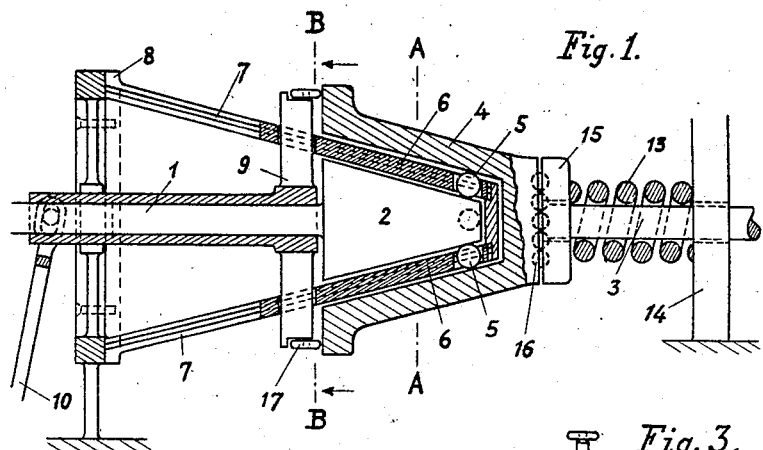
Figure 2:
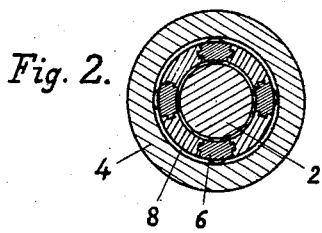
Figure 3:
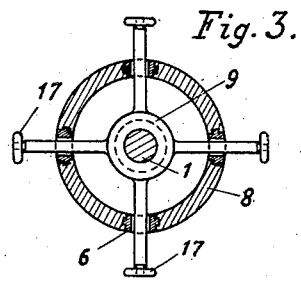
Figure 4:
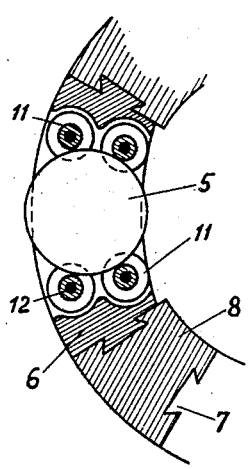
Figure 5:
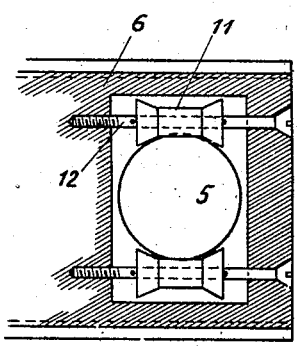

Fig. 1 shows an axial section across the mechanism;

Fig. 2 a transverse section along line A—A of Fig. 1;

Fig. 3 a section along line B—B of Fig. 1, seen in the direction of the arrow, and Figs. 4 and 5 show, on a larger scale, the manner of supporting the balls.

In the embodiment of the invention shown by way of example, a full cone (that is to say, a cone with conical outer surface) 2 is rigidly connected with the driving shaft 1, whereas a hollow cone (that is to say, a cone with conical inner surface) 4 with the same taper as the full cone is rigidly connected with the driven shaft 3. The driven shaft 3 can be shifted, together with the hollow cone 4, in an axial direction and is pressed against cone 2 by a spring 13, resting on one side against a fixed stop 14 and on the other side against a disc 15. A ball thrust bearing 16 is arranged between the hollow cone 14 connected with shaft 3 and the disc 15. Between the two coaxial cone shells, balls 5 are so disposed as to be in contact with the two cone shells. These balls rest in slides 6 which can be shifted in guide grooves 7 of a fixed intermediate cone 8 by means of dove-tailed guides. In order to effect this shifting, the driving shaft 1 carries an arm spider 9, the arms of which pass through slots of the slides 6 and upon the hub of which a lever 10 acts, the arm spider on shaft 1 and thus the slides 6 with the balls being shifted all together and uniformly by moving said lever. The balls 5 are held in slides 6 between two pairs of rollers 11 which are rotatable in the slide about the axes 12. The diameter of the rollers is larger at the sides than in the middle in order to serve as guide to the ball and to take it along with them when the slide is shifted. The arms of the spider 9 are provided with rollers 17 running, when the spider is in the right-hand limit position, on the front side of the hollow cone.

The mechanism works as follows:

The rotation of the driving shaft 1 is transmitted to the driven shaft 2 by the balls arranged between the cones, the direction of rotation of the driven shaft being opposite to that of the driving shaft. The ratio of transmission is then determined by the ratio of the diameters of the circles of contact of the balls on the two cones 2 and 4, and as this latter ratio is different in the various positions of the cones, the transmission varies when the balls are shifted by means of lever 10 and arm spider 9, that is to say, the transmission diminishes by shifting the balls to the left from the position drawn in the figure. According to what has been shown by trials, the movement of shifting can be accomplished during the rotating motion with comparative ease and without shock or jerk, the axis of rotation of the freely moveable balls automatically adjusting itself according to the requirements.

Should the rollers 17 of the arm spider 9 strike against the front side of the hollow cone 4 whilst said spider is shifted to the right, the transmission can be interrupted by a further slight shifting in the same direction, the hollow cone 4 with shaft 3 being shifted to the right by the pressure of the arm spider and its contact with the balls broken. When the arm spider comes back, the hollow cone 4 follows owing to the pressure of spring 13, until it again comes into contact with the balls. Thus, throwing in and out can, as may be seen, only take place at the lowest speed in this case.

By applying larger or smaller balls, the limits of the ratio of transmission can be varied. This can be achieved by arranging the intermediate cone 8 in such a way that it is interchangeable, thus enabling said variation of the ratio of transmission to be accomplished by fitting in another intermediate cone with larger or smaller balls.

By combining two systems of cones of this kind with one another, the same direction of rotation of the two shafts can be obtained, and by several systems of this kind the number of transmissions can be increased.

The hollow cone can also be so constructed as to form a belt pulley and movably arranged on a through-shaft provided with the full cone, thus enabling the device to impart various numbers of revolutions to said pulley. By this means, the mechanism can be used instead of a cone pulley.

The number of balls can be chosen as desired; it will preferably be so fixed as to suit the size and purpose of the device.

Amongst other applications the mechanism can be used in motor cars.

Having fully described my invention, what I claim as new, and desire to secure by Letters Patent, is:

1. A friction-wheel change speed gear comprising in combination coaxial parallel rotating cone-shells arranged in one another, a fixed intermediate cone placed between the rotating cone shells, slides guided in the intermediate cone so as to be able to slide longitudinally therein, and free rotating balls supported in the slides and being in contact with the coaxial cone shells, for transmitting the movement from the one to the other.

2. A friction-wheel change speed gear comprising in combination coaxial parallel rotating cone shells arranged in one another, a fixed intermediate cone placed between the rotating cone shells and provided with longitudinal grooves, slides guided in said grooves to be shifted longitudinally therein, and free rotating balls supported in said slides and being in contact with the coaxial cone shells for transmitting the movement from one to the other.

3. A friction-wheel change speed gear comprising in combination coaxial parallel rotating cone-shells arranged in one another, a fixed intermediate cone placed between the rotating cone shells, slides guided in the intermediate cone so as to be able to slide longitudinally therein, and free rotating balls supported in the slides and being in contact with the coaxial cone shells for transmitting the movement from the one to the other, each of said balls being held between two pairs of guide rollers, each having a smaller diameter in the middle than at either side.

4. A friction-wheel change speed gear comprising in combination coaxial parallel rotating cone shells arranged in one another, a fixed intermediate cone placed between the rotating cone shells, slides guided in the intermediate cone so as to be able to slide longitudinally therein, rotating friction members supported in the slides and being in contact with the rotating cone shells for transmitting the movement from one to the other, a sliding arm spider acting upon the slides, a lever connected to said spider for shifting the latter for the purpose of conjointly moving the slides with said friction members.

5. A friction-wheel change speed gear comprising in combination, two coaxial parallel rotating cone shells arranged in one another, the outer of which being slidably mounted, a fixed intermediate cone placed between the two rotating cone shells, slides guided longitudinally in the intermediate cone, rotating friction members supported in the slides and being in contact with the rotating cone shells for transmitting the movement from one to the other, a sliding arm spider acting upon the slides, means for shifting the arm spider, and rollers carried by said arm spider for engagement with the outer cone whereby the latter may be moved to break its contact with the said friction members.

6. A friction-wheel change speed gear comprising in combination coaxial parallel rotating cone-shells arranged in one another, a fixed intermediate cone placed between the rotating cone shells and supporting slidably friction members for transmitting the movement between the cone shells, the intermediate cone with the said transmission members being interchangeable and the interval of the cone shells variable, in order to vary the limits of the transmission by fitting in another intermediate cone with other friction members.

7. A friction wheel change speed gear comprising two or more sets of friction mechanisms arranged in one another, each friction mechanism comprising two coaxial parallel rotating cone shells arranged in one another, a fixed intermediate cone placed between the rotating cone shells, slides guided in the intermediate cone so as to be able to slide longitudinally therein, and free rotating balls supported in the slides and being in contact with the coaxial cone shells for transmitting the movement from the one to the other.

In witness whereof I have hereunto set my hand.

CARL CONRAD.